(12) United States Patent
Hanisch

(10) Patent No.: US 11,975,579 B1
(45) Date of Patent: May 7, 2024

(54) BOAT SECUREMENT ALERTING APPARATUS

(71) Applicant: Andrew Hanisch, Harrisburg, SD (US)

(72) Inventor: Andrew Hanisch, Harrisburg, SD (US)

( * ) Notice: Subject to any disclaimer, the term of this patent is extended or adjusted under 35 U.S.C. 154(b) by 362 days.

(21) Appl. No.: 17/509,472

(22) Filed: Oct. 25, 2021

(51) Int. Cl.
| | |
|---|---|
| *B60D 1/62* | (2006.01) |
| *B60P 3/10* | (2006.01) |
| *B60Q 9/00* | (2006.01) |
| *B60Q 11/00* | (2006.01) |

(52) U.S. Cl.
CPC .............. *B60D 1/62* (2013.01); *B60P 3/1033* (2013.01); *B60Q 9/00* (2013.01); *B60Q 11/00* (2013.01)

(58) Field of Classification Search
CPC   B60D 1/62; B60P 3/1033; B60Q 9/00; B60Q 11/00
See application file for complete search history.

(56) References Cited

U.S. PATENT DOCUMENTS

| | | |
|---|---|---|
| 4,271,401 A | 6/1981 | Meo |
| 4,593,264 A | 6/1986 | Engle |
| 5,421,600 A | 6/1995 | Jones |
| 5,572,186 A * | 11/1996 | Traxler ................ G08B 13/126 |
| | | 200/61.18 |
| 6,402,445 B1 | 6/2002 | Smiley |
| 6,923,138 B2 | 8/2005 | Holbrook |
| 8,031,061 B2 * | 10/2011 | Kalous ................... B60Q 1/305 |
| | | 340/425.5 |
| 8,590,916 B2 | 11/2013 | Velton |
| 9,028,183 B1 | 5/2015 | Dressen |
| 2022/0144165 A1* | 5/2022 | Boone ..................... G01F 23/30 |

FOREIGN PATENT DOCUMENTS

CA            2243675         1/1999

* cited by examiner

*Primary Examiner* — James J Yang
(74) *Attorney, Agent, or Firm* — Jeffrey A. Proehl; Woods, Fuller, Shultz & Smith PC

(57) ABSTRACT

A boat securement alerting apparatus may include a sensing assembly for sensing existence of a securing condition of a boat securing apparatus. The sensing assembly may include a sensor device with an actuator being movable between an actuated position and a released position. A portion of the actuator may be positionable adjacent to a movable securing element of the securing apparatus such that the actuator is actuated when the movable securing element is moved to a securing position corresponding to the securing condition of the boat securing apparatus. The alerting apparatus may further include an alerting assembly configured to produce an alert when the sensing assembly senses the existence of the securing condition of the boat securing apparatus, and the alert may be a perceptible alert perceptible to a sense of a human.

20 Claims, 2 Drawing Sheets

BOAT SECUREMENT ALERTING APPARATUS

BACKGROUND

Field

The present disclosure relates to condition signaling apparatus and more particularly pertains to a new boat securement alerting apparatus for alerting persons to the securement of a boat to a boat trailer during loading of the boat onto the trailer.

SUMMARY

In one aspect, the disclosure relates to a boat securement alerting apparatus for sensing securement of a boat by a boat securing apparatus and providing an alert when the securement of the boat by the boat securing apparatus is sensed. The boat securing apparatus may be of a type having a latch mechanism with a securing condition and a releasing condition. The boat securement alerting apparatus may comprise a mounting structure configured to be mounted adjacent to the boat securing apparatus, and a sensing assembly for sensing existence of the securing condition of the latching mechanism of the boat securing apparatus. The sensing assembly may include a sensor device configured to complete an electrical circuit when the securing condition is sensed. The sensor device may comprise a housing mounted on the mounting structure, and an actuator extending from the housing and being movable between an actuated position and a released position. A portion of the actuator may be positionable adjacent to a movable securing element of the latch mechanism of the boat securing apparatus such that the actuator is actuated when the movable securing element is moved to a securing position corresponding to the securing condition of the latch mechanism. The boat securement alerting apparatus may also include an alerting assembly mounted on the mounting structure and configured to produce an alert when the sensing assembly senses the existence of the securing condition of the latching mechanism of the boat securing apparatus, and the alert may be a perceptible alert perceptible to a sense of a human.

In another aspect, the disclosure relates to a system for securing a boat on a trailer, with the boat being of the type having a securing component. The system may comprise a boat securing apparatus for securing the boat on the trailer, with the boat securing apparatus being mountable on the trailer for selectively engaging the securing component of the boat when the boat is substantially fully positioned on the trailer. The boat securing apparatus may include a latching mechanism having a securing condition and a releasing condition, with the securing condition being characterized by the latching mechanism engaging the securing component of the boat and the releasing condition being characterized by the latching mechanism being disengaged from the component of the boat. The latching mechanism may have at least one movable securing element which may be in a securing position when the latching mechanism is on the securing condition and may be in a releasing position when the latching mechanism is in the releasing condition. The movable securing element may have a movable surface which may be in a first position when the movable securing element is in the securing position and may be in a second position when the movable securing element is in the releasing position. The system may also include a boat securement alerting apparatus for sensing securement of a boat by the boat securing apparatus and providing an alert when the securement of the boat by the boat securing apparatus is sensed. The boat securement alerting apparatus may comprise a mounting structure configured to be mounted adjacent to the boat securing apparatus, and a sensing assembly for sensing existence of the securing condition of the latching mechanism of the boat securing apparatus. The sensing assembly may comprise a sensor device configured to complete an electrical circuit when the securing condition is sensed. The sensor device may comprise a housing mounted on the mounting structure, and an actuator extending from the housing and being movable between an actuated position and a released position. A portion of the actuator may be positionable adjacent to the movable surface of the movable securing element of the latch mechanism of the boat securing apparatus such that the actuator is actuated by movement of the movable surface when the movable securing element is moved to a securing position corresponding to the securing condition of the latch mechanism. The boat securement alerting apparatus may also include an alerting assembly mounted on the mounting structure and may be configured to produce an alert when the sensing assembly senses the existence of the securing condition of the latching mechanism of the boat securing apparatus. The alert may be a perceptible alert perceptible to a sense of a human.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
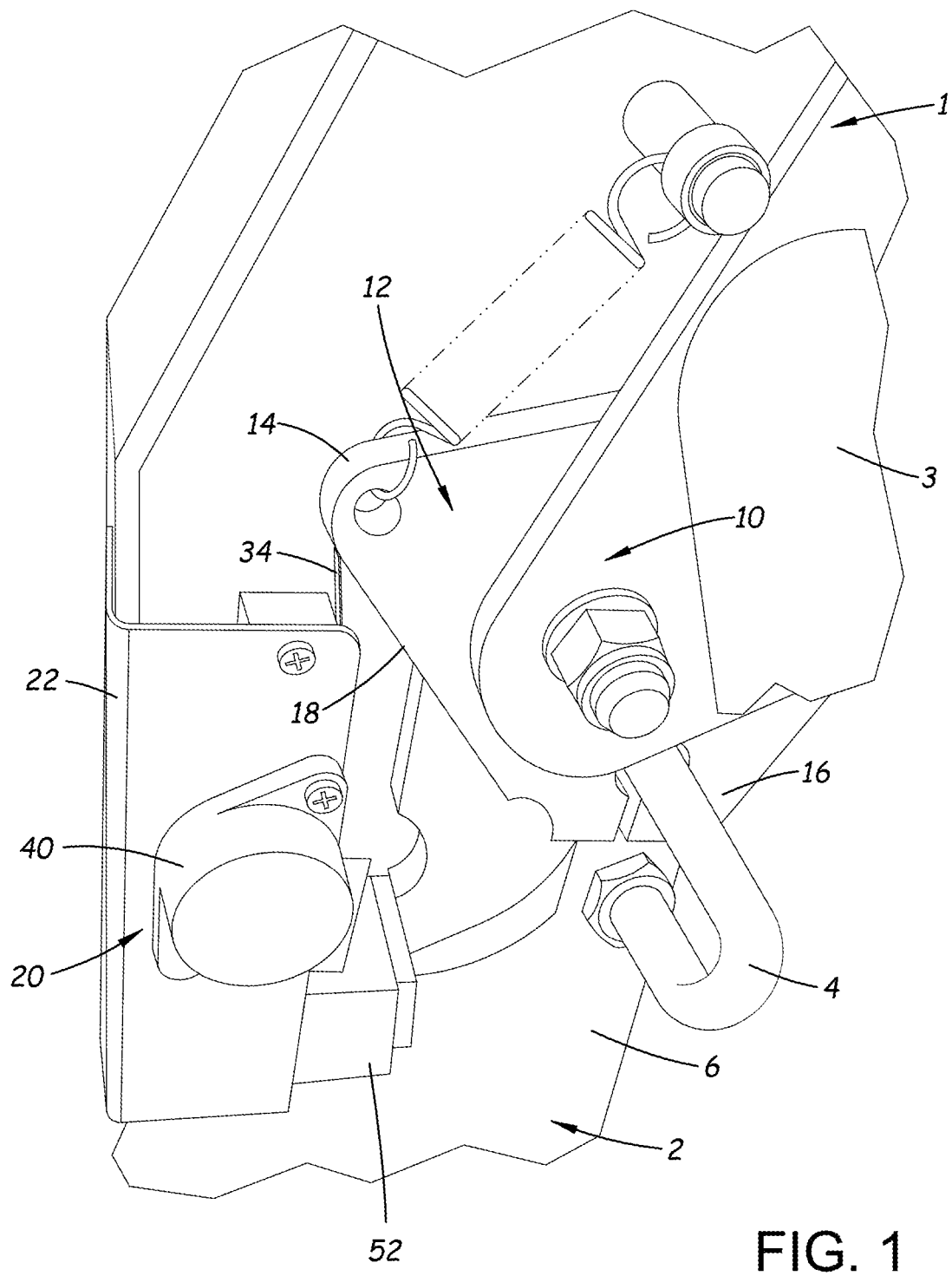
FIG. 1 is a schematic perspective view of elements of a system with a boat securing apparatus and a new boat securement alerting apparatus according to the present disclosure.
Figure 2:
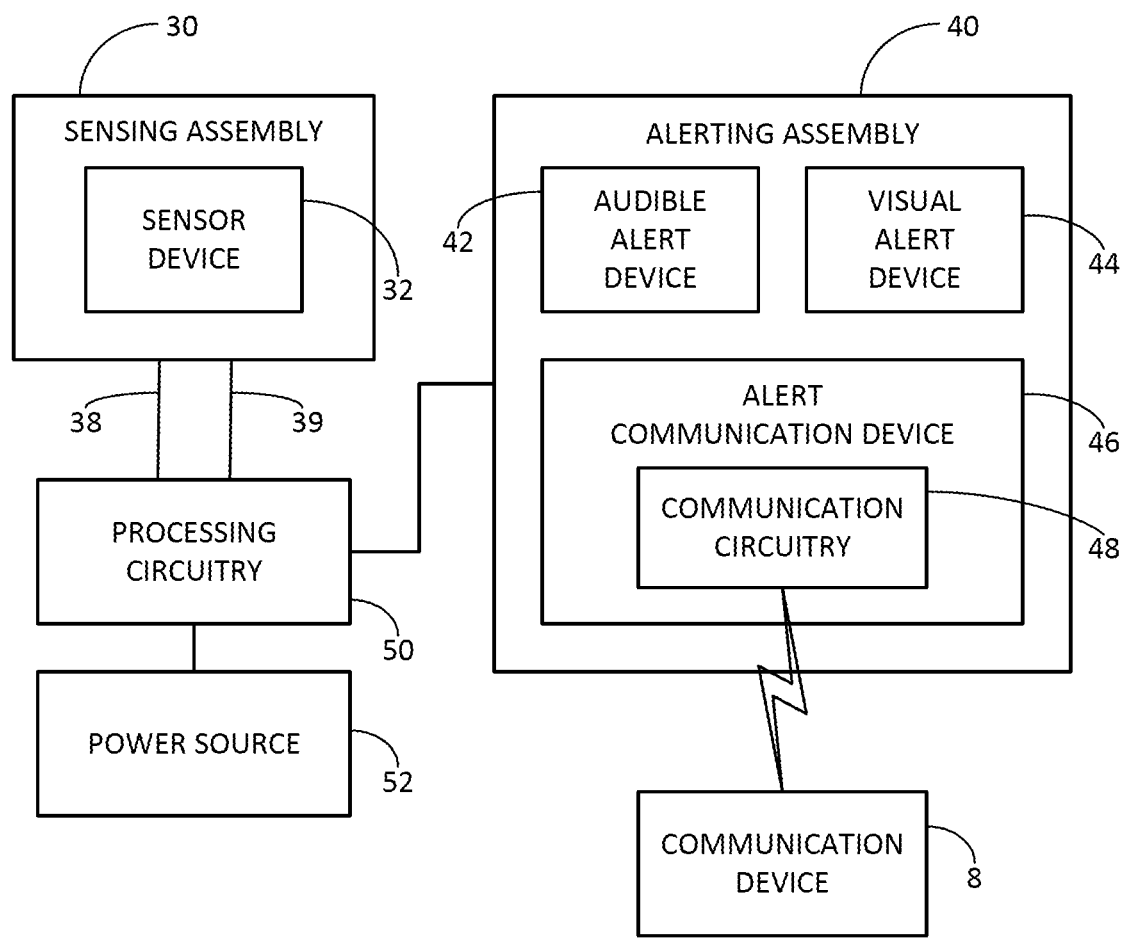
FIG. 2 is a schematic diagram of elements of the boat securement alerting apparatus, according to an illustrative embodiment.

With reference now to the drawings, and in particular to FIGS. 1 and 2 thereof, a new boat securement alerting apparatus embodying the principles and concepts of the disclosed subject matter will be described.

The applicant has recognized the convenience of using a boat securing apparatus which automatically (or without significant user intervention) secures a boat onto a transporting trailer when the boat is fully and correctly positioned on the trailer. The automatic securement of the boat on the trailer typically facilitates the process of loading the boat onto the trailer by eliminating the need to have a person operating the winch commonly found at the front of the boat trailer which is used to reel in cable attached to a hook which is in turn removably attached to a loop mounted on the hull of the boat.

The applicant has also recognized that, while eliminating the need for a person to be located at the winch of the trailer during the process of loading the boat on the trailer is convenient, a person in the boat or positioned rearwardly of the bow of the boat typically has difficulty in determining if the boat securing apparatus has successfully engaged the loop on the hull of the boat and secured the boat to the trailer, particularly when the securing apparatus is fully or partially hidden from sight to those in the boat by the bow of the boat.

The applicant has thus developed a boat securement alerting apparatus which may be used in conjunction with the boat securing apparatus to signal or alert persons in proximity to the boat (but not necessarily proximate to the boat securing apparatus) that the boat has been successfully secured by the securing apparatus, or in the absence of an alert, that the boat has not been successfully secured using the securing apparatus.

In some aspects, the disclosure relates to a system 1 for securing a boat 2 on a trailer 3 suitable to carrying the boat across the ground surface and typically along roads and highways. The boat 2 may have a securing component 4 for use in securing the boat to the trailer. The securing component 4 may comprise a loop or eyelet integrated on the boat. The loop 5 may be located on the bow portion 6 of the boat toward the front of the boat and may also be located along a keel of the boat. Conventionally, the loop 5 is engaged by a hook mounted on the end of rope or strap which is wrapped about a spool which is rotated to pull the boat onto the trailer, and released from the loop when the boat is to be launched.

In further embodiments of the disclosure, the system 1 may comprise a boat securing apparatus 10 for securing the boat on the trailer, usually without the need to use a hook and a rope or strap to engage the loop 5. The boat securing apparatus 10 may be mounted on the trailer 3 in a position on the trailer that facilitates selective engagement of the apparatus 10 with the securing component 4 of the boat when the boat is fully position, or substantially fully positioned, on the trailer. In greater detail, the boat securing apparatus includes a latching mechanism 12 for engaging the securing component 4 in a manner that secures or holds the component 4 to the mechanism 12 and the securing apparatus 10 overall. The latching mechanism 12 may thus have a securing condition which is characterized by the latching mechanism engaging the securing component of the boat to thereby secure the boat to the trailer 3 when the apparatus 10 is mounted on the trailer. The latching mechanism 12 may also have a releasing condition which is characterized by the latching mechanism 12 being disengaged from the component 4 of the boat, and thus allows the boat to move freely away from the securing apparatus 10, such as when launching the boat or when the boat is about to be loaded onto the trailer.

The latching mechanism 12 may have at least one movable securing element 14 which may be generally movable between a securing position and a releasing position. The securing position of the movable securing element 14 may correspond to the securing condition of the latching mechanism. The releasing position of the securing element 14 may correspond to the releasing condition of the latching mechanism. Illustratively, the movable securing element 14 may form a jaw or hook suitable to engage the securing component 4 of the boat in the securing position and disengage from the component 4 in the releasing position.

In some embodiments, the latching mechanism 12 genre may have a second securing element 16 which may be stationary relative to other elements of the latching mechanism, or may be movable with respect to other elements of the mechanism 12, and thus may have a securing position in the securing condition of the mechanism 12 and a releasing position in the releasing condition of the mechanism 12. Similar to the movable securing element 14, the second securing element 16 may form a jaw or hook to engage the securing component 4, but may also be of a simpler configuration which provides a surface against which the securing element 14 traps a portion of the securing component 4.

The movable securing element 14 may have a movable surface 18, or a surface on the element 14 that moves when the element 14 moves between the securing and releasing positions. Thus, the movable surface 18 may be in a first position when the movable securing element 14 is in the securing position, and the surface 18 may be in a second position when the securing element 14 is in the releasing position.

Illustratively, one suitable boat securing apparatus 10 has a construction similar to the apparatus shown in U.S. Pat. No. 9,028,183 of Dressen, which is hereby incorporated by reference in its entirety, but could also be used with other types of securing apparatus for boats.

Embodiments of the disclosure include a boat securement alerting apparatus 20 in combination with, or independent of, the boat securing apparatus 10 as well as the boat 2 and trailer 3 of the system. The boat securement alerting apparatus 20 may be configured to sense securement of the boat 2 by the boat securing apparatus 10 and to provide an alert when the securement of the boat by the boat securing apparatus is sensed. Illustratively, securement of the boat by the securing apparatus may be sensed by sensing the position of an element of the securing apparatus, such as the movable securing element 14.

In greater detail, illustrative embodiments of the boat securement alerting apparatus 20 may include a mounting structure 22 configured to be mounted adjacent to the boat securing apparatus 10, and may be configured to be mounted on to the trailer 3 adjacent to the latching mechanism 14 of the apparatus 10.

The boat securement alerting apparatus 20 may further include a sensing assembly 30 for sensing the existence of at least one condition of the latching mechanism 12 of the apparatus 10. Illustratively, the condition sensed may be the securing condition of the apparatus 10, and correspondingly the sensing assembly may sense the movable securing element being in the securing position. To sense the securing element 14 being in the securing position, the sensing assembly may sense when the movable surface 18 on the movable securing element is in the first position. The sensing assembly 30 may be mounted on the mounting structure 22 in a position suitably adjacent to the element for which the position is being sensed, such as adjacent to the movable surface 18 of the movable securing element 14.

The sensing assembly 30 may also include a sensor device 32 which may be configured to physically sense or detect the (at least one) condition of the apparatus 10, such as by sensing the physical or spatial position of the movable securing element 14, particularly when the securing element is in the securing position. In some embodiments, the sensor device 32 may be configured to complete an electrical circuit (or at least produce electrical continuity between two points) when the condition is sensed. The sensor device 32 may include an actuator 34 which is configured to be actuated when the movable securing element 14 is moved between the securing and releasing positions, and more particularly may be actuated when the movable securing element is moved into the securing position. Illustratively, the actuator 34 may contact or otherwise engage the movable surface 18 of the securing element 14 to be able to sense the position of the securing element 14, or at least when the securing element 14 is in the securing position. The actuator 34 may have an actuated position and a released position. The actuated position of the actuator 34 may correspond to the securing position of the securing element 14, and more particularly may correspond to the first position of the movable surface 18. The release position of the actuator 34 may correspond to the releasing position of the securing element 14, and more particularly may correspond to the second position of the movable surface 18. Optionally, the release position of the actuator 34 may correspond to the securing element 14 being out of (or not in) the securing position, and the movable surface 18 not being in the first position.

The sensor device 32 may further include a housing 36 which may be mounted on the mounting structure 22. The actuator 34 may extend from the housing 36 and may be movable with respect to the housing. The sensor device 32 may also have at least two electrical contacts 38, 39 positioned on the housing 36 that provide a complete electrical path between the contacts when the actuator is in the actuated position and may provide an incomplete electrical path between the contacts when the actuator is in the released position. Optionally, the sensor device 32 may be configured such that an incomplete electrical path is provided between the contacts when the actuator is in the actuated position and a complete electrical path is provided between the contacts when the actuator is in the released position. Illustratively, the sensor device 32 may comprise a device commonly referred to as a "microswitch."

The boat securement alerting apparatus 20 may further include an alerting assembly 40 for producing an alert when the sensing assembly 30 senses the existence of the (at least one) condition of the latching mechanism 12. The alert may be a perceptible alert, such as an alert that is perceptible to the senses of a human being. Illustratively, the perceptible alert may comprise an audible alert that may be perceived by the ears of a human. Further, the perceptible alert may comprise a visual alert that may be perceived by the eyes of a human. The alerting assembly 20 may be mounted on or otherwise associated with the mounting structure 22.

The alerting assembly 40 may include an audible alert device 42 which is configured to produce the audible alert, and illustratively may comprise a speaker or a buzzer or other device capable of emitting a sound. The alerting assembly 40 may additionally, or alternatively, include a visual alert device 44 which is configured to produce the visual alert, and illustratively may comprise a light source such as a lightbulb or light-emitting diode or the like.

In some implementations, the alerting assembly 40 may also include an alert communication device 46 configured to communicate the alert to a communication device 8, such as, for example, an computerized cellular telephone, or "smartphone," or other communication devices. The alert communication device 46 may include wireless communication circuitry 48 which is configured to communicate wirelessly with a communication device or a communication network. For example, the communication circuitry 48 may be configured to communicate using a Bluetooth communication protocol, a Wi-Fi communication protocol, or other wireless communication protocols.

The boat securement alerting apparatus 20 may include other elements, such as processing circuitry 50 in communication with the sensing assembly 30 to detect the a completed electrical circuit by the sensor device and in communication with the alerting assembly 40 to cause the alerting assembly to produce an alert. Further, the alerting apparatus 20 may include a power source 52 configured to provide electrical power to elements of the apparatus 20, and may include, for example, a battery which may be a replaceable battery or a rechargeable battery.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A boat securement alerting apparatus for sensing securement of a boat by a boat securing apparatus and providing an alert when the securement of the boat by the boat securing apparatus is sensed, the boat securing apparatus being of a type having a latch mechanism with a securing condition and a releasing condition, the latch mechanism having a movable securing element movable between a securing position corresponding to the securing condition and a releasing position corresponding to the releasing condition, the boat securement alerting apparatus comprising:
- a mounting structure configured to be mounted adjacent to the boat securing apparatus;
- a sensing assembly for sensing existence of the securing condition of the latching mechanism of the boat securing apparatus, the sensing assembly comprising:
  - a sensor device configured to complete an electrical circuit when the securing condition is sensed, the sensor device comprising:
    - a housing mounted on the mounting structure; and
    - an actuator extending from the housing and being movable between an actuated position and a released position, a portion of the actuator being positionable adjacent to the movable securing element of the latch mechanism of the boat securing apparatus such that the actuator is actuated by the securing element to actuate the actuator to the actuated position when the securing element is moved to the securing position and away from the releasing position of the securing element; and
- an alerting assembly mounted on the mounting structure and configured to produce an alert when the sensing assembly senses the existence of the securing condition of the latching mechanism of the boat securing apparatus, the alert being a perceptible alert perceptible to a sense of a human.

2. The apparatus of claim 1 wherein the mounting structure is configured to mount on to a trailer for carrying a boat thereon and is positionable adjacent to the latching mechanism of the boat securing apparatus in a position such that the actuator is physically moved by the securing element of the latch mechanism moving between the securing and releasing positions.

3. The apparatus of claim 1 wherein the sensor device further comprises at least two electrical contacts which provide a complete electrical path between the contacts in the actuated position of the actuator and provide an incomplete electrical path between the contacts in the released position of the actuator.

4. The apparatus of claim 1 wherein the sensor device comprises a microswitch.

5. The apparatus of claim 1 wherein the perceptible alert comprises an audible alert and the alerting assembly includes an audible alert device configured to produce the audible alert.

6. The apparatus of claim 1 wherein the perceptible alert comprises a visual alert and the alerting assembly includes a visual alert device configured to produce the visual alert.

7. The apparatus of claim 1 wherein the alerting assembly additionally comprises an alert communication device configured to communicate the alert to a communication device.

8. The apparatus of claim 1 additionally comprising processing circuitry in communication with the sensing assembly to detect the completed electrical circuit by the sensor device and in communication with the alerting assembly to cause the alerting assembly to produce the alert.

9. The apparatus of claim 1 additionally comprising a power source configured to provide electrical power to the sensing assembly and the alerting assembly.

10. The apparatus of claim 1 wherein the mounting structure is configured to mount on to a trailer configured to have a boat loaded thereon and is positionable adjacent to the latching mechanism of the boat securing apparatus;
- wherein the sensor device further comprises at least two electrical contacts which provide a complete electrical path between the contacts in the actuated position of the actuator and provide an incomplete electrical path between the contacts in the released position of the actuator;
- wherein the perceptible alert comprises an audible alert and the alerting assembly includes an audible alert device configured to produce the audible alert;
- wherein the perceptible alert comprises a visual alert and the alerting assembly includes a visual alert device configured to produce the visual alert;
- wherein the alerting assembly additionally comprises an alert communication device configured to communicate the alert to a communication device;
- processing circuitry in communication with the sensing assembly to detect the completed electrical circuit by the sensor device and in communication with the alerting assembly to cause the alerting assembly to produce the alert; and
- a power source configured to provide electrical power to the sensing assembly and the alerting assembly.

11. A system for securing a boat on a trailer, the boat being of the type having a securing component, the system comprising:
- a boat securing apparatus for securing the boat on the trailer, the boat securing apparatus being mountable on the trailer for selectively engaging the securing component of the boat when the boat is positioned on the trailer, the boat securing apparatus including a latching mechanism having a securing condition and a releasing condition, the securing condition being characterized by the latching mechanism engaging the securing component of the boat, the releasing condition being characterized by the latching mechanism being disengaged from the component of the boat, the latching mechanism having at least one movable securing element which is in a securing position when the latching mechanism is in the securing condition, the at least one movable element being in a releasing position when the latching mechanism is in the releasing condition, the movable securing element having a movable surface, the movable surface being in a first position when the movable securing element is in the securing position and being in a second position when the movable securing element is in the releasing position; and
- a boat securement alerting apparatus for sensing securement of a boat by the boat securing apparatus and providing an alert when the securement of the boat by the boat securing apparatus is sensed, the boat securement alerting apparatus comprising:
  - a mounting structure configured to be mounted adjacent to the boat securing apparatus;
  - a sensing assembly for sensing existence of the securing condition of the latching mechanism of the boat securing apparatus, the sensing assembly comprising:
    - a sensor device configured to complete an electrical circuit when the securing condition is sensed, the sensor device comprising:
      - a housing mounted on the mounting structure; and
      - an actuator extending from the housing and being movable between an actuated position and a released position, a portion of the actuator being positionable adjacent to the movable surface of the movable securing element of the latch mechanism of the boat securing apparatus such that the actuator is actuated by movement of the movable surface when the movable securing element is moved to a securing position corresponding to the securing condition of the latch mechanism; and an alerting assembly mounted on the mounting structure and configured to produce an alert when the sensing assembly senses the existence of the securing condition of the latching mechanism of the boat securing apparatus, the alert being a perceptible alert perceptible to a sense of a human.

12. The system of claim 11 wherein the mounting structure is configured to mount on to a trailer configured to carry boat thereon and is positionable adjacent to the latching mechanism of the boat securing apparatus.

13. The system of claim 11 wherein the sensor device further comprises at least two electrical contacts which provide a complete electrical path between the contacts in the actuated position of the actuator and provide an incomplete electrical path between the contacts in the released position of the actuator.

14. The system of claim 11 wherein the perceptible alert comprises an audible alert and the alerting assembly includes an audible alert device configured to produce the audible alert.

15. The system of claim 11 wherein the perceptible alert comprises a visual alert and the alerting assembly includes a visual alert device configured to produce the visual alert.

16. The apparatus of claim 11 wherein the alerting assembly additionally comprises an alert communication device configured to communicate the alert to a communication device.

17. The apparatus of claim 11 additionally comprising processing circuitry in communication with the sensing assembly to detect the completed electrical circuit by the sensor device and in communication with the alerting assembly to cause the alerting assembly to produce the alert.

18. The apparatus of claim 11 additionally comprising a power source configured to provide electrical power to the sensing assembly and the alerting assembly.

19. The apparatus of claim 11 wherein the mounting structure is configured to mount on to a trailer configured to have a boatload thereon and is positionable adjacent to the latching mechanism of the boat securing apparatus.

20. A system for securing a boat on a trailer, the boat being of the type having a securing component, the system comprising:

a boat securing apparatus for securing the boat on the trailer, the boat securing apparatus being mountable on the trailer for selectively engaging the securing component of the boat when the boat is positioned on the trailer, the boat securing apparatus including a latching mechanism having a securing condition and a releasing condition, the securing condition being characterized by the latching mechanism engaging the securing component of the boat, the releasing condition being characterized by the latching mechanism being disengaged from the component of the boat, the latching mechanism having at least one movable securing element which is in a securing position when the latching mechanism is in the securing condition, the at least one movable element being in a releasing position when the latching mechanism is in the releasing condition, the movable securing element having a movable surface, the movable surface being in a first position when the movable securing element is in the securing position and being in a second position when the movable securing element is in the releasing position; and a boat securement alerting apparatus for sensing securement of a boat by the boat securing apparatus and providing an alert when the securement of the boat by the boat securing apparatus is sensed, the boat securement alerting apparatus comprising:

a mounting structure configured to be mounted adjacent to the boat securing apparatus;

a sensing assembly for sensing existence of the securing condition of the latching mechanism of the boat securing apparatus, the sensing assembly comprising:

a sensor device configured to complete an electrical circuit when the securing condition is sensed, the sensor device comprising:

a housing mounted on the mounting structure; and an actuator movable changeable between an actuated condition and a released condition, a portion of the actuator being positionable adjacent to the movable surface of the movable securing element of the latch mechanism of the boat securing apparatus such that the actuator is actuated by movement of the movable surface when the movable securing element is moved to a securing position corresponding to the securing condition of the latch mechanism; and an alerting assembly mounted on the mounting structure and configured to produce an alert when the sensing assembly senses the existence of the securing condition of the latching mechanism of the boat securing apparatus, the alert being a perceptible alert perceptible to a sense of a human.

* * * * *